(12) United States Patent
Kura et al.

(10) Patent No.: US 6,475,092 B1
(45) Date of Patent: Nov. 5, 2002

(54) CONSTANT VELOCITY UNIVERSAL JOINT

(75) Inventors: Hisaaki Kura; Tatsuro Sugiyama, both of Iwata; Masayuki Kuroda, Osaka; Kenji Terada, Iwata, all of (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 09/673,241

(22) PCT Filed: Mar. 2, 2000

(86) PCT No.: PCT/JP00/01247

§ 371 (c)(1),
(2), (4) Date: Dec. 4, 2000

(87) PCT Pub. No.: WO00/53944

PCT Pub. Date: Sep. 14, 2000

(30) Foreign Application Priority Data

| Mar. 5, 1999 | (JP) | ............................................. | 11-059040 |
| Nov. 5, 1999 | (JP) | ............................................. | 11-315929 |

(51) Int. Cl.⁷ .............................................. F16D 3/202
(52) U.S. Cl. ....................................... 464/111; 464/124
(58) Field of Search ........................... 464/111, 120–124, 464/905

(56) References Cited

U.S. PATENT DOCUMENTS

| 4,808,144 A | * | 2/1989 | Orain | ........................... | 464/111 |
| 5,538,473 A | * | 7/1996 | Busch et al. | ................. | 464/111 |
| 5,571,047 A | | 11/1996 | Stall et al. | | |
| 5,788,577 A | | 8/1998 | Kadota et al. | | |
| 5,989,124 A | * | 11/1999 | Goto et al. | .............. | 464/905 X |
| 2001/0041621 A1 | * | 11/2001 | Sugiyama et al. | ........... | 464/111 |

FOREIGN PATENT DOCUMENTS

| JP | 111781/1985 | 2/1987 |
| JP | 10-967430 | 4/1998 |
| JP | 11-336784 | 12/1999 |
| JP | 2000-27880 | 1/2000 |
| WO | 98/09089 | 3/1998 |

\* cited by examiner

*Primary Examiner*—Greg Binda
(74) *Attorney, Agent, or Firm*—Arent Fox Kintner Plotkin & Kahn

(57) ABSTRACT

A constant velocity universal joint with a further reduction in inductive thrust and slide resistance. The constant velocity universal joint comprises: an outer joint member 10 having three track grooves 12 each having circumferentially-opposed roller guideways 14; a tripod member 20 having three radially-projecting trunnions 22; a roller 34 inserted in each of the track grooves 12; and a ring 32 fitted on each of the trunnions 22 to support the roller 34 rotatably, the roller 34 being movable in axial directions of the outer joint member 1 along the roller guideways 14. Here, the inner periphery of the ring 32 is shaped arcuate and convex in section. The outer periphery of each of the trunnions 22 is shaped straight in longitudinal section, as well as formed in cross section so as to make a contact with the inner periphery of the ring 32 along a direction perpendicular to the axis of the joint and create a clearance with the inner periphery of the ring 32 in an axial direction of the joint.

17 Claims, 11 Drawing Sheets

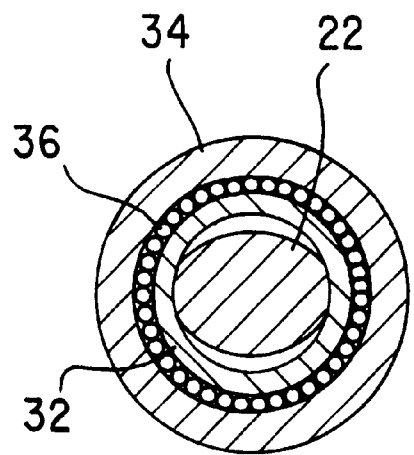
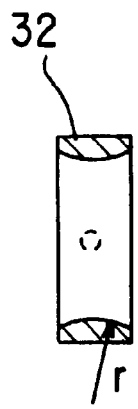
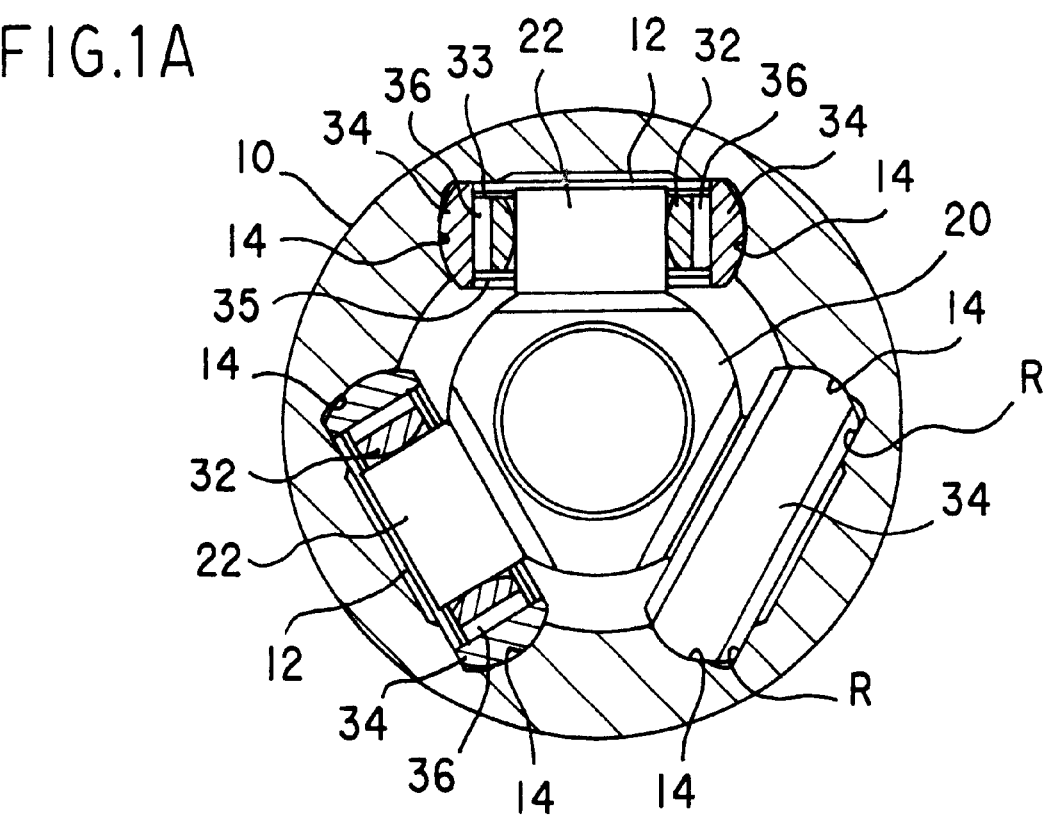

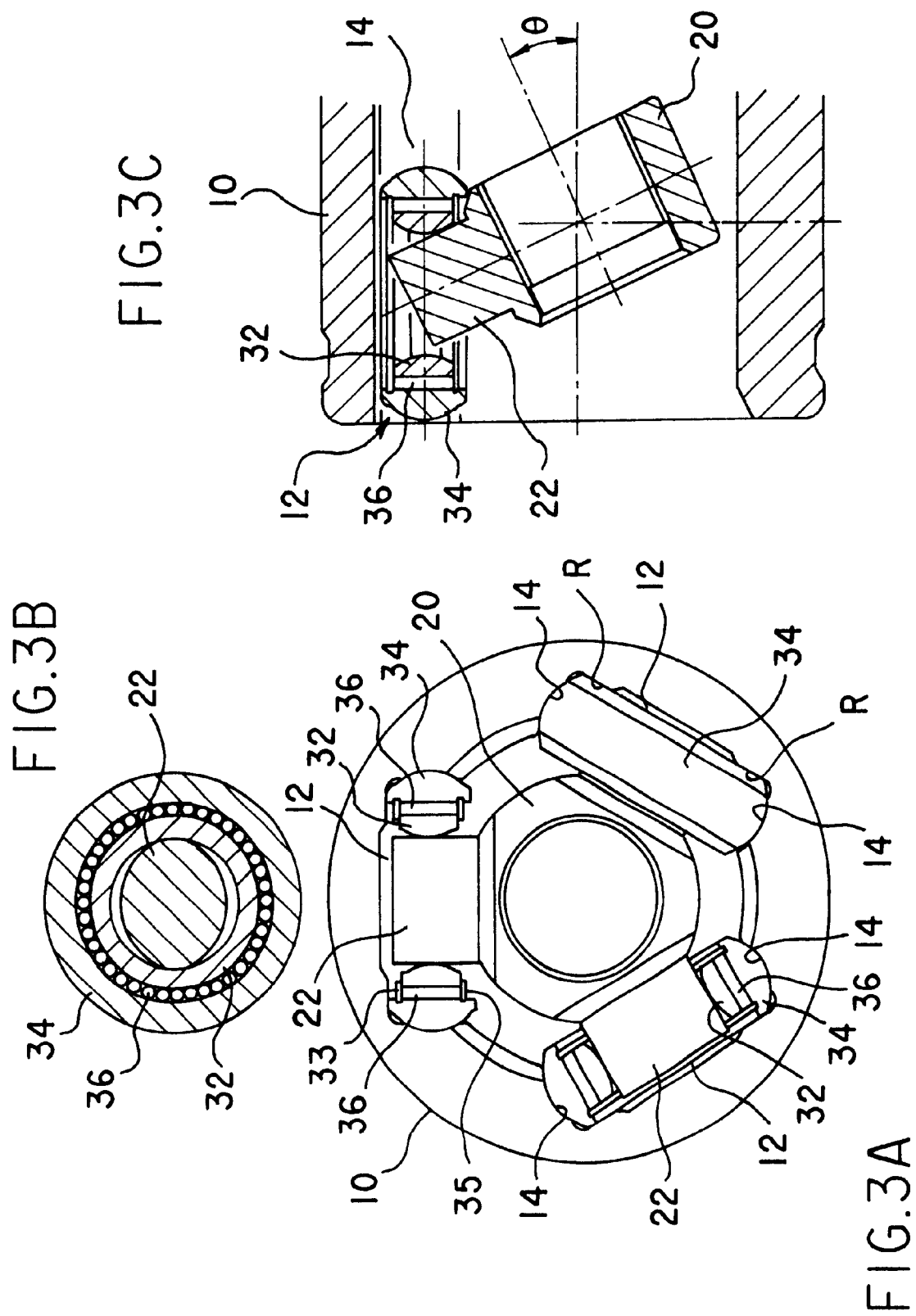

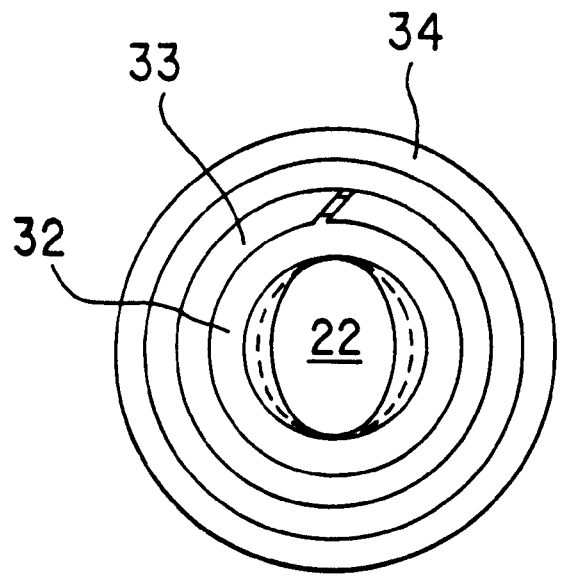
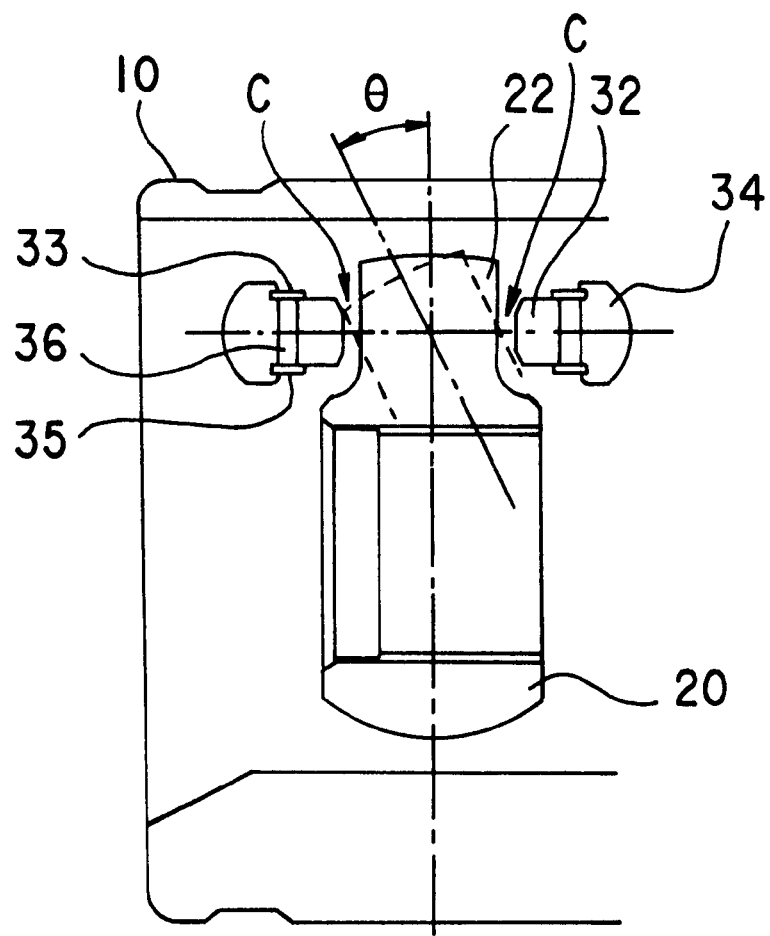

FIG.11A
RELATED ART
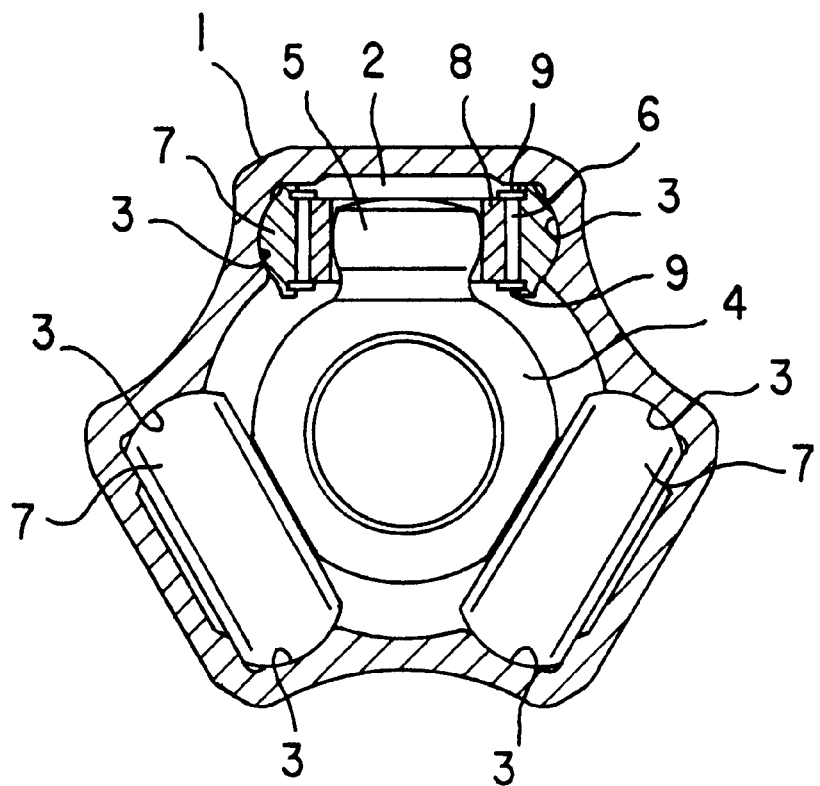
FIG.11B
RELATED ART
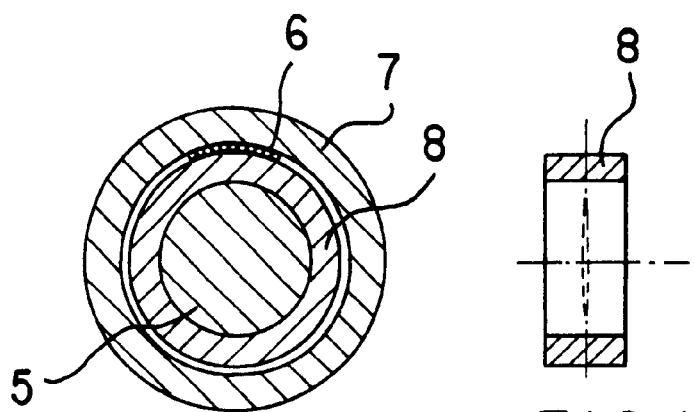
FIG.11C
RELATED ART

CONSTANT VELOCITY UNIVERSAL JOINT

BACKGROUND OF THE INVENTION

1. Field of the Invention

The present invention relates to a sliding type, tripod type constant velocity universal joint.

Generally, a constant velocity universal joint is a kind of universal joint that establishes connection between a driving shaft and a driven shaft to allow torque transfer with constant velocity regardless of the angle between the two shafts. In a sliding type, joint plunging permits relative axial displacements between the two shafts. In a tripod type, a tripod member having three radially-projecting trunnions is linked to one of the shafts, and a hollow, cylindrical outer joint member having three axially-extending track grooves is linked to the other, so that the track grooves in the outer joint member accommodate the trunnions of the tripod member for torque transfer.

2. Description of the Related Art

Now, referring to FIGS. 10(A) to 10(C), description will be given of a sliding type, tripod type constant velocity universal joint. In this universal joint, an outer joint member 1 has three cylindrical track grooves 2 axially formed in its inner periphery. A tripod member 4 inserted into the outer joint member 1 has three radially-projecting trunnions 5. Each of the trunnions 5 has a cylindrical outer periphery on which an annular roller 7 is rotatably fitted via a plurality of needle rollers 6. The rollers 7 are inserted into the track grooves 2. Each track groove 2 has a pair of circumferentially-opposed roller guideways 3 which are concave surfaces axially parallel to each other. Each of the rollers 7 on the three trunnions 5 has an outer periphery of convex surface conforming to the roller guideways 3. Each roller 7 can move along the corresponding track groove 2 while engaging with the roller guideways 3 of the track groove 2 to rotate about the trunnion 5.

When the joint transfers torque with an operating angle of θ as shown in FIG. 10(B), the rollers 7 and the roller guideways 3 are put in an oblique relationship as shown in FIG. 10(C). In this case, the roller 7 tries to roll in the direction shown by the arrow t in FIG. 10(B). However, since the track groove 2 is part of a cylindrical surface parallel to the axis of the outer joint member, the roller 7 is confined to move along the track groove 2. As a result, the roller guideway 3 and the roller 7 cause a slide therebetween, producing a slide resistance. This slide also leads to an inductive thrust in the axial direction. Such slide resistances and inductive thrusts contribute to the production of vibrations and noises from a car body, affecting the noise vibration harshness (NVH) performances of motor vehicles and decreasing the flexibility in automotive suspension design. Thus, the resistances and thrusts are desirably reduced as much as possible.

Sliding type, tripod type constant velocity universal joints known as contemplated to reduce such slide resistances and inductive thrusts include the one having the structure shown in FIGS. 11(A) to 11(C). Specifically, as shown in the figures, each trunnion 5 of the tripod member 4 has an outer periphery of perfect spherical surface. To the perfect spherical surface is slidably fitted on the cylindrical inner periphery of a cylindrical ring 8. Each ring 8 and roller 7 constitutes a roller assembly capable of relative rotations therebetween through the medium of rolling elements. Needle rollers 6, the rolling elements, are arranged between the cylindrical outer periphery of the ring 8 and the cylindrical inner periphery of the roller 7 to provide a so-called full complement type bearing. The needle rollers 6 are stopped by annular washers 9. The rollers 7 are accommodated in the track grooves 2 of the outer joint member 1 so as to move along the axial directions of the outer joint member 1 while rolling on the roller guideways 3 in the track grooves 2.

The outer periphery of each trunnion 5 is a perfect spherical surface having the center of curvature on the axis of the trunnion 5. The roller assembly (7, 8) nutates about the center of curvature. Due to the roller assembly's capability of nutation, when the outer joint member 1 and the tripod member 4 perform torque transfer with an operating angle, the rollers 7 are guided by the roller guideways 3 of the outer joint member 1 so as to remain parallel to the axis of the outer joint member 1 while properly rolling on the roller guideways 3 in the same orientations. This reduces slides during the operation with angles, thereby suppressing the production of slide resistances and inductive thrusts.

Sliding type, tripod type constant velocity universal joints are known as being used for constant-velocity torque transfer from the engine to wheels of a motor vehicle. In a sliding type, tripod type constant velocity universal joint, spherical rollers are mounted on the trunnions of its tripod member. Between the outer peripheries of the trunnions and the inner peripheries of the spherical rollers are arranged needle rollers as rolling elements. The needle rollers are used as full complement type bearings without retainers. In transferring torque with an operating angle, internal components of the joint cause mutual frictions to generate inductive thrusts during rotations. Even at rest, forced extension or contraction of the joint produces slide resistances. Automotive NVH phenomena typically associated with such inductive thrusts and slide resistances include the rolling of a moving car and the vibrations of a car idling with its automatic transmission in a drive or D range, respectively.

The essence of the solution to the automotive NVH problems consists in reducing inductive thrusts and slide resistances a joint can produce. In general, inductive thrusts and slide resistances from a joint tend to depend upon the operating angle of the joint. In applications to automotive drive shafts, this tendency leads to a design limitation of prohibiting greater operating angles. Accordingly, the challenge to an improvement in flexibility of automotive suspension design is to reduce and stabilize the inductive thrusts and slide resistances.

SUMMARY OF THE INVENTION

In view of the foregoing, it is an object of the present invention to further reduce and stabilize such inductive thrusts and slide resistances.

According to an embodiment of the invention, a constant velocity universal joint comprises: an outer joint member having three track grooves each having circumferentially-opposed roller guideways; a tripod member having three radially-projecting trunnions; a roller inserted in each of the track grooves; and a ring fitted on each of the trunnions to support the roller rotatably, the roller being movable in axial directions of the outer joint member along the roller guideways. Here, the inner periphery of the ring is shaped arcuate and convex insection. The outer periphery of each of the trunnions is shaped straight in longitudinal section, as well as formed in cross section so as to make a contact with the inner periphery of the ring along a direction perpendicular to the axis of the joint and create a clearance with the inner periphery of the ring in an axial direction of the joint.

The cross-sectional configuration of the trunnions so as to make a contact with the inner periphery of the ring along a direction perpendicular to the axis of the joint and create a clearance with the inner periphery of the ring in an axial direction of the joint may otherwise be put in the following words. That is, the faces opposed to each other in the axial direction of the tripod member have made a retreat toward each other, i.e., to smaller diameters than the diameter of the imaginary cylindrical surface. A concrete example of such configuration is an ellipse.

Due to the alteration in cross section from the conventional circular shape to the configuration described above, the trunnions can tilt with respect to the outer joint member without changing the orientations of the roller assemblies when the joint operates with an operating angle. Besides, as is apparent from a comparison of FIG. 1(C) with FIG. 11(C), the osculating ellipses of the rings with the outer peripheries of the trunnions approach from oblong ellipses to points in shape. This reduces the friction moments functioning to tilt the roller assemblies. As a result, the orientation of the roller assemblies is stabilized, so that the rollers are maintained parallel to the roller guideways for smooth rolling. This smooth rolling contributes to reduced slide resistances and, finally, to reduced inductive thrusts. Moreover, there is an advantage that the trunnions improve in flexural strength because of an increase in the section modulus at the bottom portions of the trunnions.

The roller assemblies are to be interposed between the trunnions and the outer joint member for the sake of torque transfer. In a constant velocity universal joint of this type, the transfer direction of torque is always perpendicular to the axis of the joint. Thus, as long as they contact in the transfer direction of the torque, the trunnions and the rings can perform torque transfer without trouble even when they have clearances therebetween in the axial directions of the joint.

The trunnions maybe formed to have a cross section of generally elliptic configuration with the major axis perpendicular to the axis of the joint. The generally elliptic configuration is not literally limited to perfect ellipses, and may include those generally referred to as ovals and suchlike. More specifically, the trunnions can adopt such cross-sectional configurations as to relax contact pressures against the rings and avoid a drop in strengths of trunnions. Besides, the trunnions can tilt without inclining the rings, which prevents the rollers from inclination and allows the rollers to roll smoothly on the roller guideways. As a result, it becomes possible to omit ribs which sometimes are arranged on the track grooves in the outer joint member with an aim to restrain the inclination of the rollers. The omission of the ribs not only reduces the outer joint member in weight and simplifies the machining thereto, but eliminates slide resistances that result from the slide contacts between the rollers and the ribs. This achieves a further reduction in slide resistance and inductive thrust.

The outer periphery of each trunnion and the inner periphery of the ring may advantageously create a clearance of 0.001a or more therebetween in a circumferential direction of the joint, where a is the semi major axis of the generally elliptic cross section of the trunnion. Such clearances can well absorb the tilt of the trunnions resulting from the revolutions of the trunnion center, which is peculiar to tripod type constant velocity universal joints. This absorption removes the factors responsible for the inclinations of the roller assemblies within the joint's cross section, contributing to improved NVH performances of motor vehicles.

The generator to the inner periphery of the ring may be composed of an arc portion at the center and relief portions on both sides. The radius of curvature at the arc portion favorably has a value that allows the trunnions to make a lean of the order of 2–3°.

A plurality of rolling elements are arranged between the ring and the roller to allow relative rotations between the ring and the roller. Aside from cylindrical rollers such as needle rollers, the rolling elements maybe balls as well. Here, the contact between the trunnion and the inner periphery of the ring always stays at the lateral center of the ring, thereby ensuring the stable rolling of the rolling elements. Besides, the centers of the inner peripheral surface of the ring and of the outer peripheral surface of the roller are on substantially the same level, which ensures that the roller assembly remains steady without tilting.

The outer periphery of the roller may be formed in a spherical form to make an angular contact with the roller guideways in the outer joint member. The angular contacts between the roller and the roller guideways make the roller less prone to vibrate, stabilizing the orientation of the roller. As a result, the roller can roll on the roller guideways with smaller resistances when moving along the axial direction of the outer joint member. The specific cross-sectional configurations for the roller guideways to establish such angular contacts include a tapered and a Gothic arc shape.

Grinding may be applied to the outer periphery of each of the trunnions, exclusively at a prescribed area including the contact area to the inner periphery of the ring. In consideration of machining errors and the like, the prescribed area is favorably determined to be somewhat wider than the contact area. The remaining area other than the prescribed area may be left forge-finished without any grinding. This allows a cut in machining time and a reduction in cost.

The present invention provides a constant velocity universal joint comprising: an outer joint member having three track grooves each having circumferentially-opposed roller guideways; a tripod member having three radially-projecting trunnions; a roller inserted in each of the track grooves; and a ring fitted on each of the trunnions to support the roller rotatably, the roller being movable in axial directions of the outer joint member along the roller guideways. Here, the inner periphery of the ring is shaped arcuate and convex in section. The outer periphery of each of the trunnions is shaped straight in longitudinal section, as well as formed in cross section so as to make contact with the inner periphery of the ring along a direction perpendicular to the axis of the joint and create a clearance with the inner periphery of the ring in an axial direction of the joint. Accordingly, when the joint operates with an operating angle, the trunnions can tilt with respect to the outer joint member without ever changing the orientations of the roller assemblies. Besides, the osculating ellipse between the outer periphery of each trunnion and the ring approaches from an oblong ellipse to a point in shape. This change in shape reduces the friction moment functioning to tilt the roller assembly. In addition, the contacts between the trunnions and the rings' inner peripheries always stay at the lateral centers of the rings. Therefore, even when rolling elements such as needle rollers are arranged between the rings and the rollers, the undeviating contacts ensure the stable rolling of the rolling elements. As a result, the orientations of the roller assemblies are stabilized consistently, so that the rollers can be maintained parallel to the roller guideways to roll smoothly. This smooth rolling contributes to reduced slide resistances and reduced inductive thrusts as well. Moreover, there is an advantage that the trunnions are improved in flexural strength because of an increase in the section modulus at the bottom portions of the trunnions.

The nature, principle, and utility of the invention will become more apparent from the following detailed description in conjunction with the accompanying drawings in which like parts are designated by like reference numerals or characters.

BRIEF DESCRIPTION OF THE DRAWINGS

In the accompanying drawings:

FIG. 1(A) is a cross sectional view of a constant velocity universal joint, showing an embodiment of the present invention;

FIG. 1(B) is a sectional view of a trunnion and a roller assembly, as seen perpendicularly to the trunnion;

FIG. 1(C) is a sectional view of a ring;

FIG. 3(A) is a partially-sectioned end view of a constant velocity universal joint, showing another embodiment of the present invention;

FIG. 3(B) is a sectional view of a trunnion and a roller assembly, as seen perpendicularly to the trunnion;

FIG. 3(C) is a longitudinal sectional view of the constant velocity universal joint with an operating angle;

FIG. 6(A) is a longitudinal sectional view of a constant velocity universal joint;

FIG. 6(B) is a plan view of a trunnion and a roller assembly;

FIG. 11(A) is a cross sectional view of another conventional tripod type constant velocity universal joint;

FIG. 11(B) is a sectional view of a trunnion, as seen perpendicularly to the trunnion; and FIG. 11(C) is a sectional view of a ring, for explaining the osculating ellipse.

DETAILED DESCRIPTION OF THE PREFERRED EMBODIMENTS

Figure 2A:
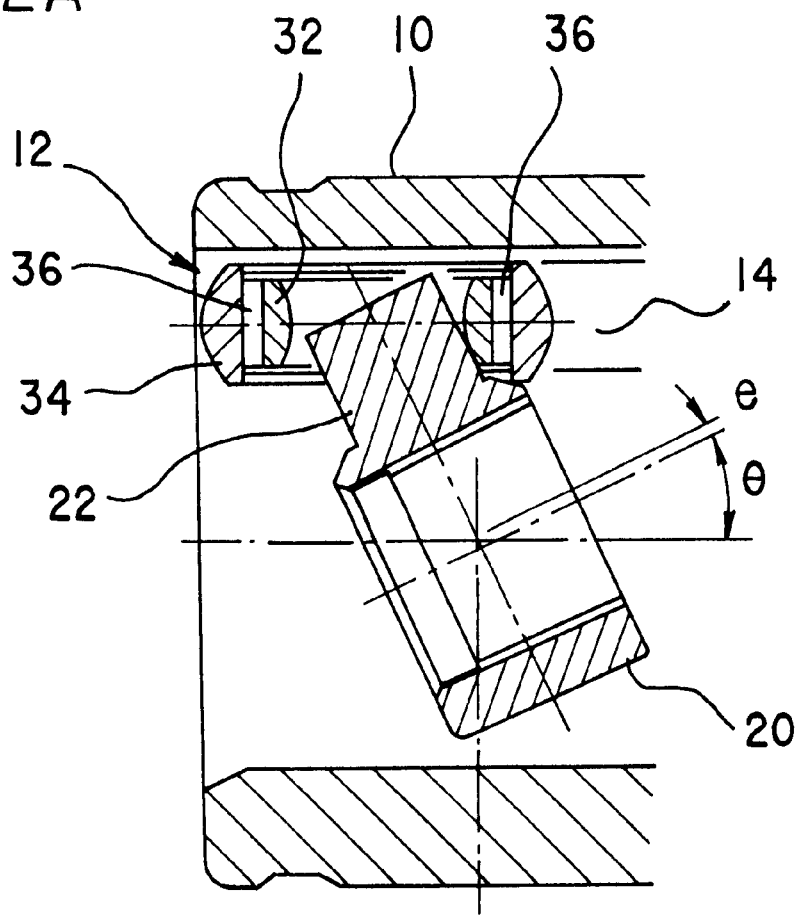
FIG. 2(A) is a longitudinal sectional view of the constant velocity universal joint of FIGS. 1(A) to 1(C) with an operating angle.

Now, description will be given of an embodiment shown in FIGS. 1(A) through 2(B) FIG. 1(A) shows a cross section of the joint. FIG. 1(B) shows a section perpendicular to a trunnion. FIG. 2(A) shows a longitudinal section of the joint with an operating angle of θ. As shown in FIG. 1(A), this constant velocity universal joint is composed of an outer joint member 10 and a tripod member 20. One of two shafts to be connected is linked to the outer joint member 10, and the other to the tripod member 20.

The outer joint member 10 has three axially-extending track grooves 12 in its inner periphery. Each of the track grooves 12 has circumferentially-opposed roller guideways 14 formed on its sidewalls. The tripod member 20 has three radially-projecting trunnions 22, on each of which is mounted a roller 34. The rollers 34 are accommodated in the track grooves 12 of the outer joint member 10. The rollers 34 have an outer periphery of convex surface conforming to the roller guideways 14.

The outer periphery of each roller 34 forms a convex surface whose generator is an arc having the center of curvature radially off the axis of the trunnion 22. The roller guideways 14 have a section of Gothic arc shape. Thus, the rollers 34 and the roller guideways 14 make angular contacts. In FIG. 1(A), dot-dash lines show the lines of action between two contact positions. With respect to the spherical outer peripheries of the rollers, the roller guideways 14 may otherwise have a cross section of tapered shape to achieve angular contacts with the rollers. The adoption of such configurations that provide angular contacts between the rollers 34 and the roller guideways 14 makes the rollers less prone to vibrate, thereby stabilizing the orientations of the rollers. For cases where angular contacts are not adopted, the roller guideways 14 may be configured e.g. by part of a cylindrical surface whose axis is parallel to that of the outer joint member 10. In this case, the cross-sectional shape of the guideways may be an arc corresponding to the generator to the outer peripheries of the rollers 34.

A ring 32 is fitted on the outer periphery of each trunnion 22. The ring 32 and roller 34 are unitized via a plurality of needle rollers 36 to constitute a roller assembly capable of relative rotations therebetween. More specifically, the cylindrical outer periphery of the ring 32 and the cylindrical inner periphery of the roller 34 serve as the inner and outer raceway surfaces, respectively, and the needle rollers 36 are rotatably interposed between these inner and outer raceway surfaces. As shown in FIG. 1(B), the needle roller 36 are arranged in a so-called full complement state, where the rollers are loaded in as many as possible without any retainer. The reference numerals 33 and 35 designate a pair of washers. These washers are fitted to annular grooves formed in the inner peripheries of the rollers 34, with an aim to stop the needle rollers 36 from coming off. Each of the washers 33, 35 has one cutout portion across its circumferential direction (see FIG. 6(B)) so as to elastically contract in diameter when fitted to the annular groove in the inner periphery of the roller 34.

In longitudinal section (FIG. 1(A) or 2(A)), each trunnion 22 has the outer periphery of straight shape parallel to the axis of the trunnion 22. In cross section (FIG. 1(B)), the trunnion 22 has an elliptic shape whose major axis is orthogonal to the axis of the joint. The cross section of the trunnion 22 is formed to be generally elliptic with a reduction in the thickness in the axial direction of the tripod member 20. In other words, each trunnion has such a cross-sectional configuration that the faces opposed to each other in the axial direction of the tripod member have made a retreat toward each other, i.e., to smaller diameters than the diameter of the imaginary cylindrical surface.

Each of the rings 32 has an inner periphery of arcuate, convex section. That is, the generator to the inner periphery is a convex arc having a radius of r (FIG. 1(C)). This combines with the above-described general elliptic cross sections of the trunnions 22 and the provision of prescribed clearances between the trunnions 22 and the rings 32 to permit each ring 32 moving along the axial direction of the corresponding trunnion 22 as well as nutating about the trunnion 22. In addition, the ring 32 and the roller 34 are unitized via the needle rollers 36 to be capable of relative rotations as described above. Therefore, the ring 32 and roller 34 are allowed to make nutations about the trunnion 22 as a unit. Here, the term "nutation" refers to the tilt which the axes of the ring 32 and roller 34 make within the plane containing the axis of the trunnion 22, with respect to the axis of the trunnion 22 (see FIG. 2(A)).

In the conventional joint shown in FIGS. 11(A) to 11(C), each trunnion 5 makes contact with the inner periphery of the ring 8 at the full length of its outer periphery. This produces a circumferentially-extended osculating ellipse as shown by the broken line in FIG. 11(C). Therefore, when the trunnion 5 tilts with respect to the outer joint member 1, friction moment arises that functions to tilt the ring 8, and finally the roller 7, with the movement of the trunnion 5. Meanwhile, in the embodiment shown in FIGS. 1(A)–1(C), the generally elliptic cross-section of the trunnions 22 and the cylindrical cross-section of the inner periphery of the rings 32 combine to make an osculating ellipse closer to a point as shown in FIG. 1(C), reducing the area at the same time. As a result, the forces to tilt the roller assemblies (32, 34) decrease greatly as compared to the conventionals, with a further improvement in the orientation stability to the rollers 34. In the conventional joint of FIGS. 11(A) to 11(C), when the operation angle is zero, the trunnions 5 and the rings 8 contact at the lateral centers of the rings 8 as shown in FIG. 11(A). However, when the operation angle is greater than zero and the joint transfers torque, the trunnions 5 swing back and forth, as seen in FIG. 11(A), to shift the contact positions of the trunnions 5 with the rings 8 to be lower than a plane perpendicular to the longitudinal axes of and passing through the widthwise center of the rings 8, hereinafter referred to as a lateral center. This leads to unstable behavior of the needle rollers 6, sometimes hampering their stable rolling. In contrast, in the embodiment of FIGS. 1(A) to 1(C), the contact positions of the trunnions 22 with the inner peripheries of the rings 32 always stay at the lateral centers of the rings 32, thereby ensuring the stable rolling of the needle rollers 36. Besides, the centers of the inner peripheral surface of the ring 32 and of the outer peripheral surface of the roller 34 are on substantially the same level, which ensures that the roller assembly (32, 34) remains steady without tilting.

Now, description will be given of another embodiment shown in FIGS. 3(A) through 4. Incidentally, FIG. 3(A) shows in section some parts, namely, the rings 32, roller 34, and washers 33 and 35; however, hatch patterns to distinguish these cross sections are omitted for the sake of avoiding congestion with leader lines and center lines. The only difference between this embodiment and the foregoing embodiment consists in the following point. That is, the generator to the inner peripheries of the rings 32 in the foregoing consists of a single arc, whereas the generator in this embodiment is composed of an arc portion 32a at the center and relief portions 32b on both sides. The role of the relief portions 32b is to avoid the interference with the trunnions 22 at an operating angle of θ, as shown in FIG. 3(C). Each relief portion 32b is formed by a straight or curved line that gradually spreads out in the diametral direction of the ring 32 as approaching from an edge of the arc portion 32a to an end of the ring 32. The relief portions 32b illustrated herein are formed as part of a circular conical surface having a vertex angle α=50°. The arc portion 32a has a large radius of curvature e.g. on the order of 30 mm in order to allow the trunnion 22 tilting 2–3° or so with respect to the ring 32.

Figure 2B:
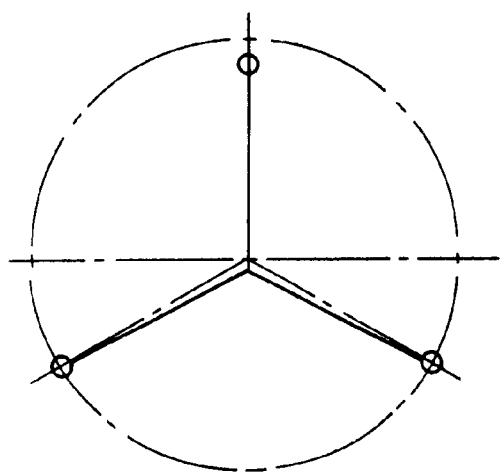
FIG. 2(B) is a schematic side view of the tripod member in FIG. 2(A)

In a tripod type constant velocity universal joint, one rotation of the outer joint member 10 constitutionally produces three revolutions of the tripod member 20 with respect to the center of the outer joint member 10. Here, the amount of eccentricity represented by the reference symbol e (in FIG. 2(A)) increases in proportion to the operating angle θ. While the three trunnions 22 are spaced by 120° from one another, the operating angle θ causes the trunnions 22 to tilt, as shown in FIG. 2(B). More specifically, with reference to the vertical trunnion 22 shown to the upper in the figure, the other two trunnions 22 are declined slightly from their zero-operation-angle axes shown by the dot-dash lines. For example, an operating angle θ of approximately 23° causes a decline of the order of 2 to 30°. This decline is readily allowable due to the curvature of the arc portions 32a on the inner peripheries of the rings 32. Therefore, the bearing pressures at the contact portions between the trunnions 22 and the rings 32 can be prevented from increasing excessively. Shown in FIG. 2(B) is a schematic representation of the three trunnions 22 of the tripod member 20 as seen from the left side of FIG. 2(A), the trunnions being represented by the full lines. The major axis 2a of each trunnion 22 and the inner diameter of the corresponding ring 32 make a clearance for absorbing the tilt of the trunnion 22 resulting from the revolution of the trunnion center, which is peculiar to tripod type constant velocity universal joints. Specific figures to this clearance will be described later in detail.

Figure 5:
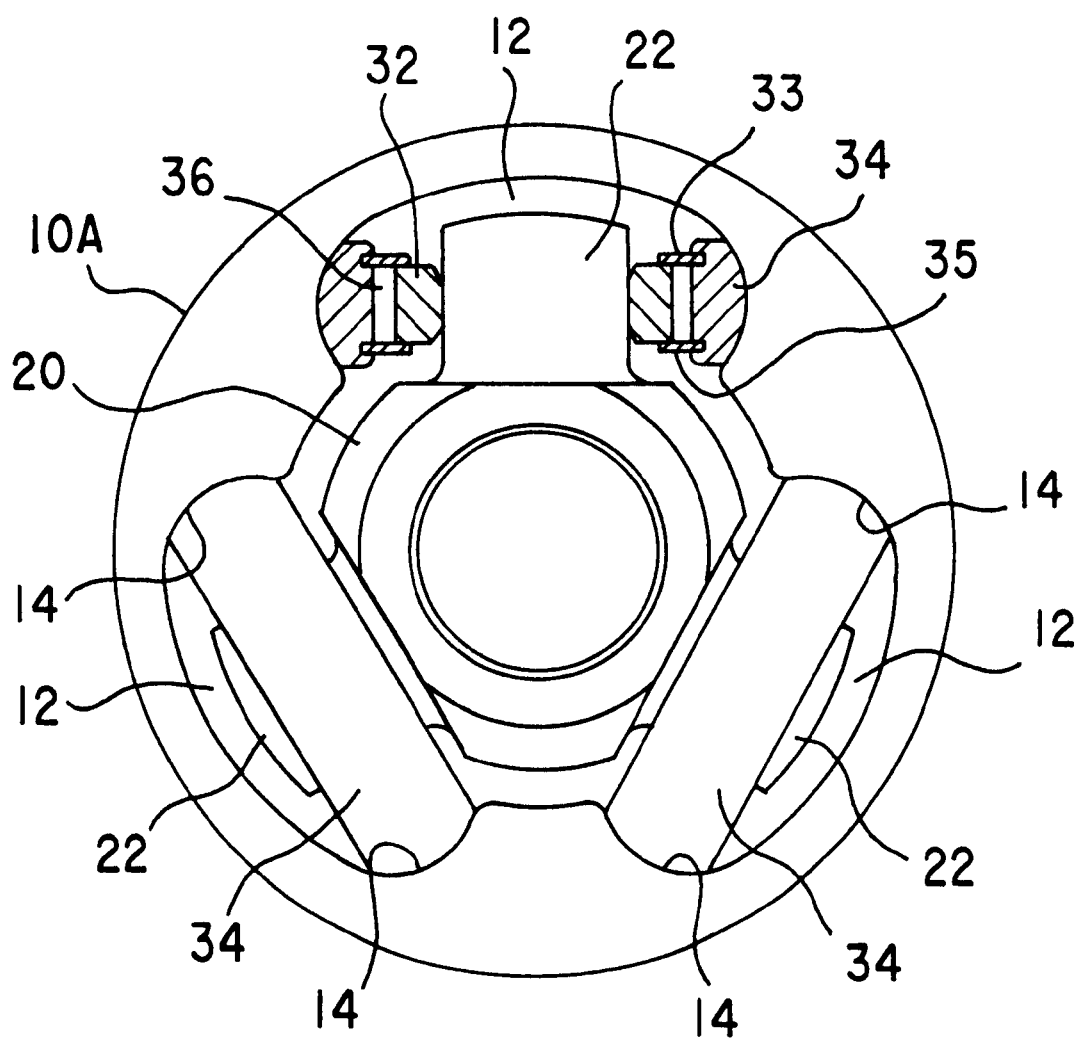
FIG. 5 is a partially-sectioned end view of a constant velocity universal joint, showing another embodiment of the outer joint member.

As shown in FIGS. 1(A) and 3(A), the above-described embodiments comprise ribs R for restraining the rollers 34 from tilting. These ribs R are formed on the bottoms of the track grooves 12, i.e., on the sides of greater diameter as seen in the cross section of the outer joint member 10, so as to be opposed to the outer end faces of the rollers 34. Each of the above embodiments as well as those to be described below, however, is free from the factors responsible for the tilts of the rollers 34. Accordingly, such ribs R in the track grooves 12 are not always required, and may be omitted from the outer joint member 10(A) as seen in FIG. 5. This eliminates the fear that the rollers 34 might contact the ribs R to produce sliding frictions when the rollers 34 are momentarily swung by some reason.

In the implementation of the present invention, a relaxation in bearing pressure is required due to the fact that, as shown in FIGS. 6(A) and 6(B), the trunnions 22 having a generally elliptic cross section and the rings 32 having a circular cross section contact to transfer torque. Hereinafter, description will be directed to specific embodiments for that purpose. Incidentally, the vertical direction in FIG. 6(B) represents the load direction, and the horizontal the non-load direction.

When the joint transfers torque with an operating angle of θ, each trunnion 22 makes reciprocating swings within the operating angle θ to the ring 32, as shown by the broken lines in FIG. 6(A). Here, in the non-load direction, the trunnion 22 and the ring 32 have a relatively large clearance C therebetween, which allows the trunnion 22 to swing without interfering with the ring 32. In the load direction, however, the trunnion 22 increases in apparent curvature as shown by the broken line in FIG. 6(B) when the operating angle θ increases to widen the lean of the trunnion 22. When the apparent curvature exceeds the curvature of the inner diameter of the ring 32, the trunnion 22 comes into two-point contact with the ring 32. Thereafter, the trunnion 22 cannot tilt freely by itself, and starts to involve the ring 32, and finally the roller assembly (32, 34), in its inclination. Accordingly, the cross-sectional configuration of the trunnions 22, especially the dimensions in the load direction, should be determined so that the trunnions 22 can tilt within a prescribed angle range by themselves without interfering with the rings 32.

Figure 4:
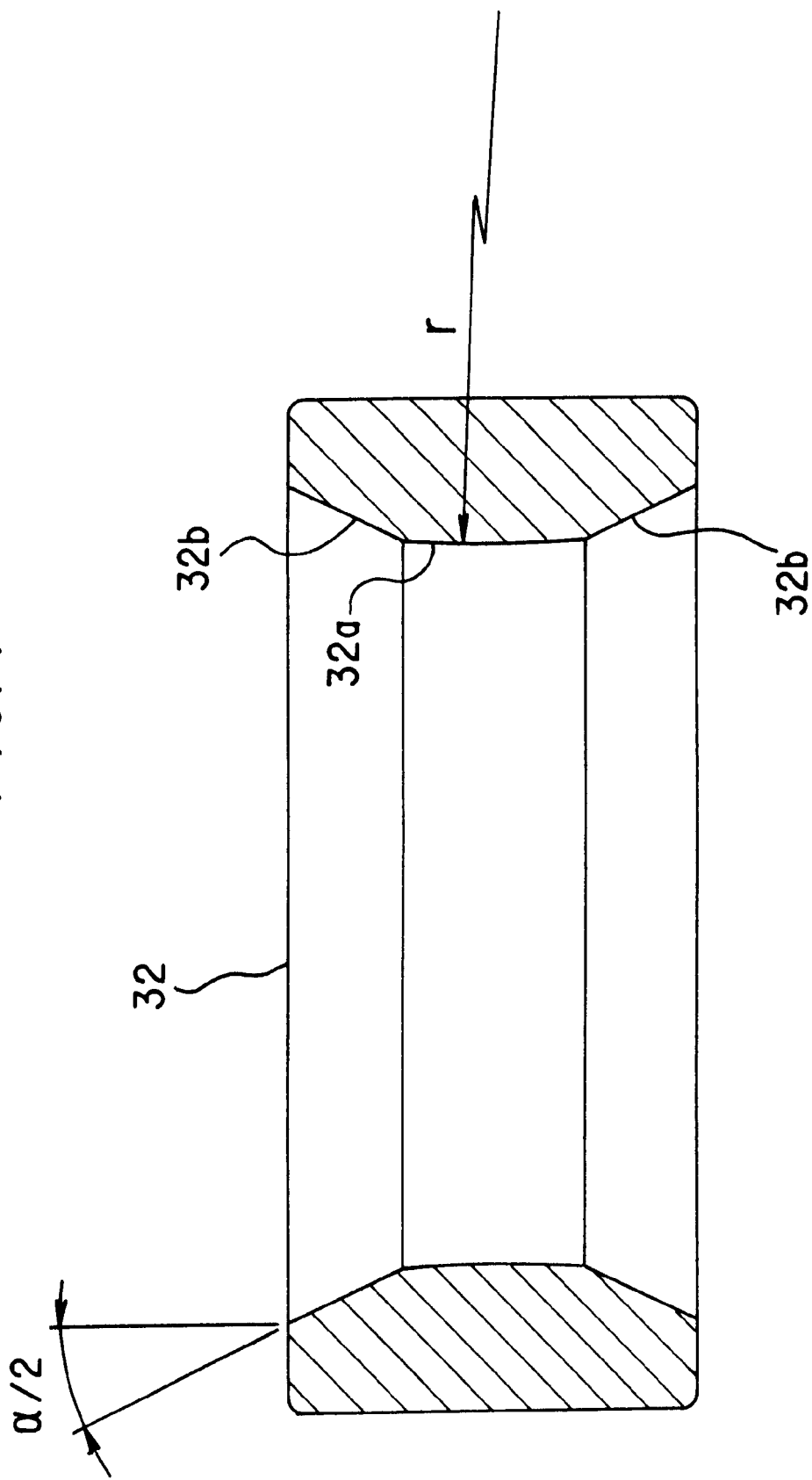
FIG. 4 is an enlarged sectional view of the ring shown in FIGS. 3(A) to 3(C)
Figure 7:
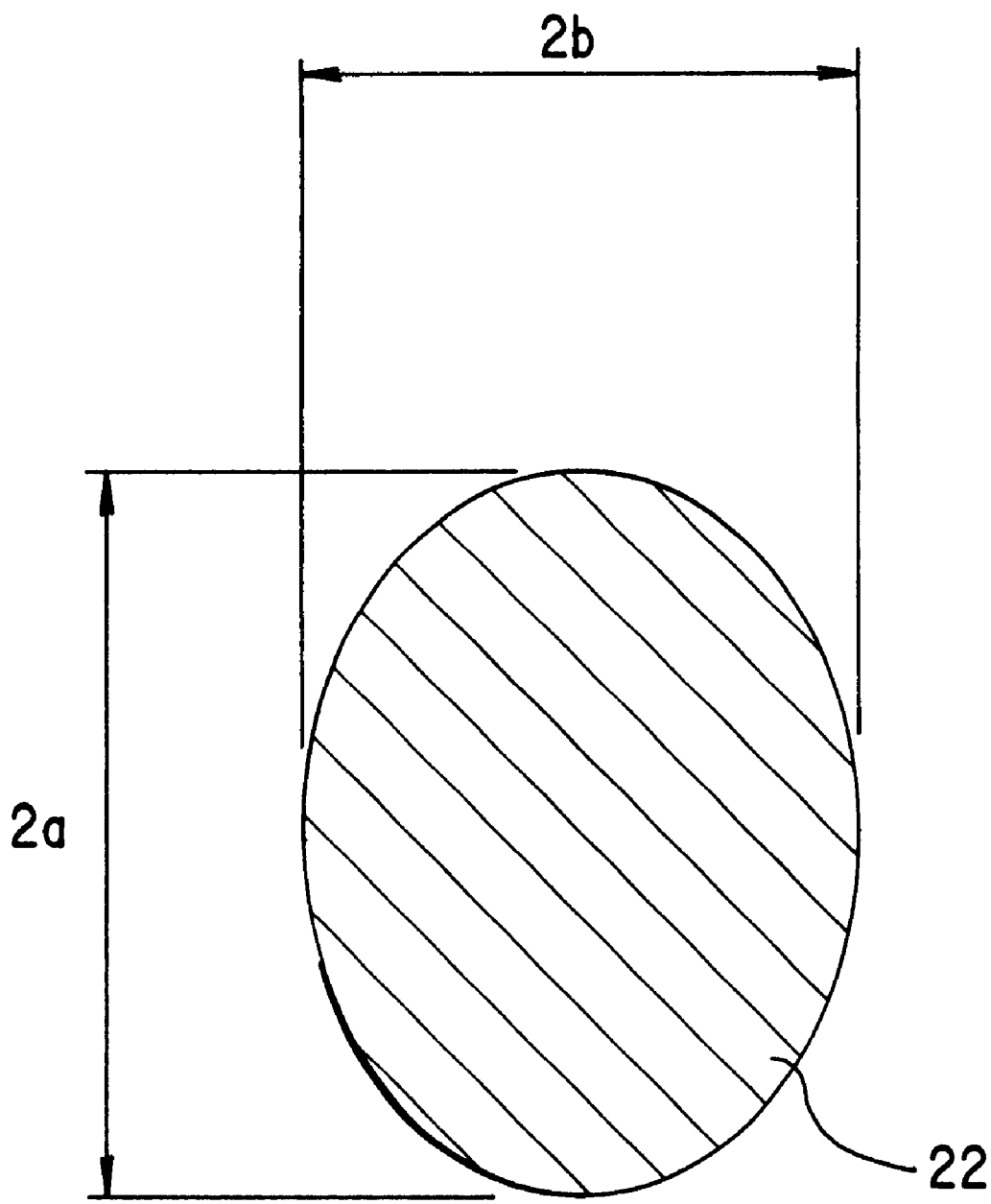
FIG. 7 is a cross sectional view of a trunnion.

Specifically, given that the maximum operating angle θ max is 25°, the setting that allows the joint to take the maximum operating angle without tilting the rings 32and minimizes the bearing pressures between the trunnions 22 and the rings 32 is as follows:

r=1.369a b/a=0.759, where, as shown in FIG. 7, a is the semi major axis of the generally elliptic cross section of a trunnion 22, b is the semi minor axis of the same, and r is the radius of curvature of the ring's inner periphery (see FIGS. 1(C) and 4).

Given that the radius of curvature r of the ring's inner periphery has a recommendable range of 0.5r and 1.5r, i.e., 0.684a and 2.053a, the ellipticity b/a falls within the range of 0.836 and 0.647.

The above-mentioned setting is indeed implementable in terms of dimensions. However, the setting may cause bearing pressures between the trunnions 22 and the rings 32 too high to make practical use of the joint for motor vehicles. If low vibrations are desired in the range of normal operating angles in automotive applications, then the operating angle can be lowered to the extent that the roller assemblies (32, 34) will not tilt. This decreases the bearing pressures to allow practical use of the joint. For example, Table 1 shows optimum values and recommendable ranges to the radius of curvature r of the ring's inner periphery and the ellipticity b/a, given that the normal operating angle θ is greater than 10° and smaller than 20°.

TABLE 1

|  | Operating angle θ (°) | Optimum value (minimum bearing pressure) | Recommendable range | |
|---|---|---|---|---|
|  |  |  | 0.5 r | 1.5 r |
| r | 20 | 1.994a | 0.997a | 2.992a |
|  | 15 | 2.898a | 1.449a | 4.347a |
|  | 10 | 4.731a | 2.365a | 7.096a |
| b/a | 20 | 0.806 | 0.875 | 0.730 |
|  | 15 | 0.859 | 0.914 | 0.801 |
|  | 10 | 0.909 | 0.948 | 0.869 |

Figure 8:
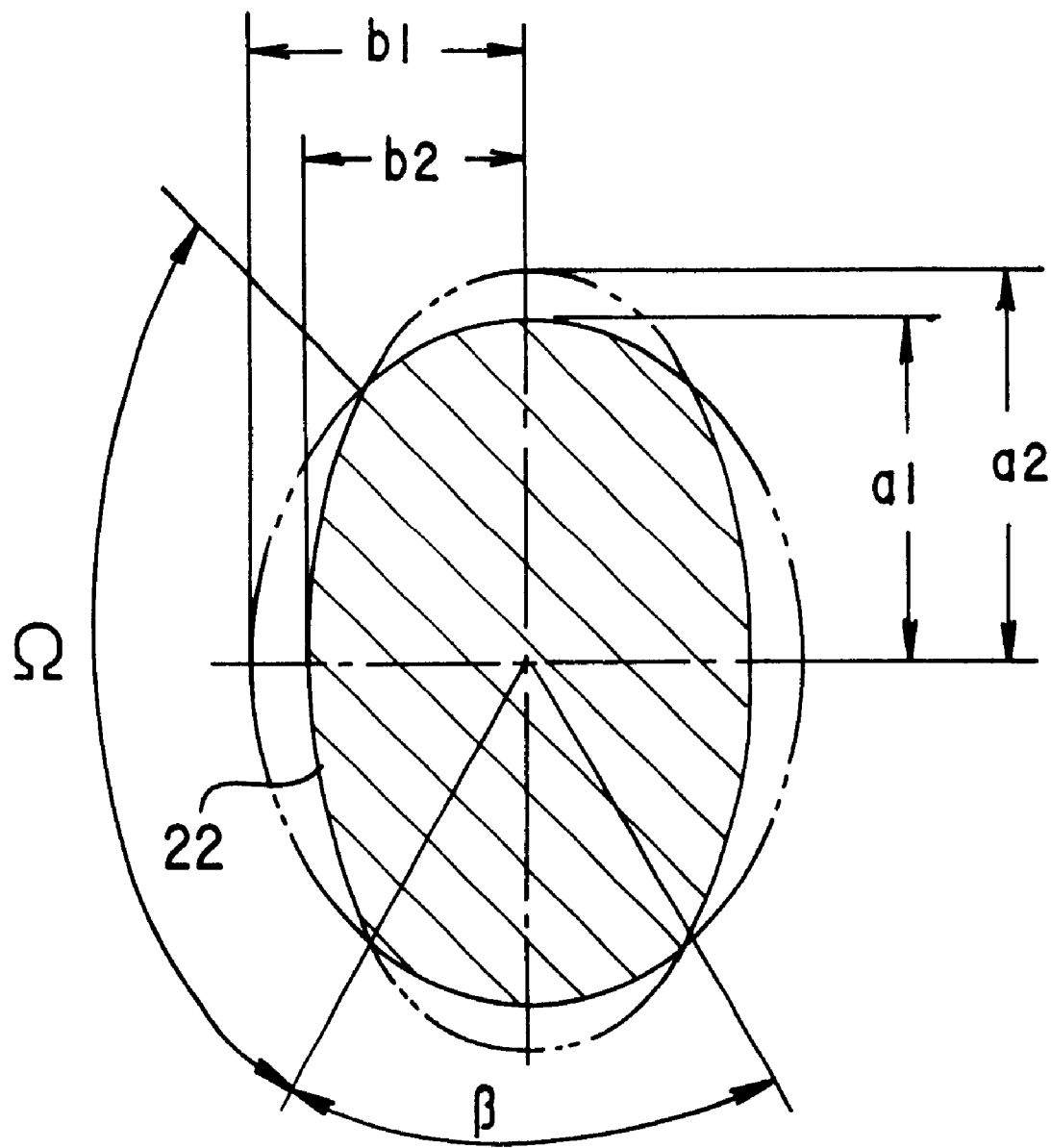
FIG. 8 is a cross sectional view of a trunnion.

As mentioned previously, the smaller the ellipticity b/a of the generally elliptic cross section of the trunnions 22 is, the greater an operating angle may be while allowing the trunnions 22 to tilt without inclining the roller assemblies (32, 34). Smaller ellipticities, however, cause an increase in the bearing pressure at the contact areas and a decrease in the strength of the trunnions 22. Thus, in the embodiment shown in FIG. 8, the trunnion 22 has a cross section of composite elliptic configuration. That is, a greater ellipticity b1/a1 is applied exclusively to areas for contacting the ring 32, i.e., to contact areas β whereas the remaining, non-contact areas Ω are formed with an ellipticity b2/a2 that only prevents the interference at the maximum operating angle. For example, given that the normal operating angle is 15° and the radius of curvature r to the inner periphery of the ring 32 is 2.898a, the ellipticity b1/a1 to the contact areas and the ellipticity b2/a2 to the non-contact areas are set to 0.859 and 0.635, respectively. As mentioned above, a generator to the inner periphery of the ring 32 includes a convex surface having an arc at the center. A radius of curvature of the convex arc ranges from 0.6(a) to 7.0(a). Incidentally, FIG. 8 shows only one contact area β to the lower. It seems needless to add that another contact area exists to the upper in the diagram due to the symmetric cross section of the trunnion 22.

Figure 9:
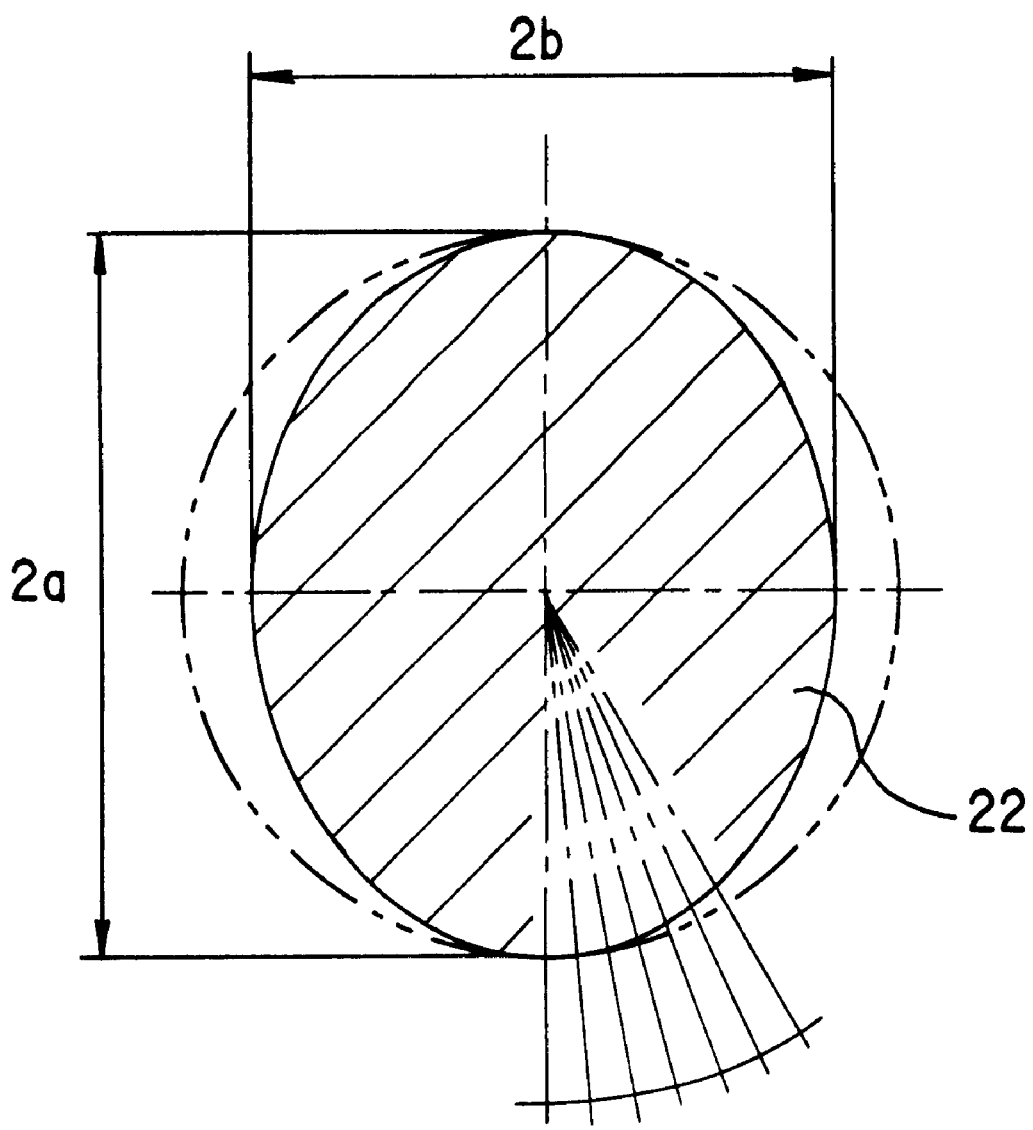
FIG. 9 is a cross sectional view of a trunnion.
Figure 10A:
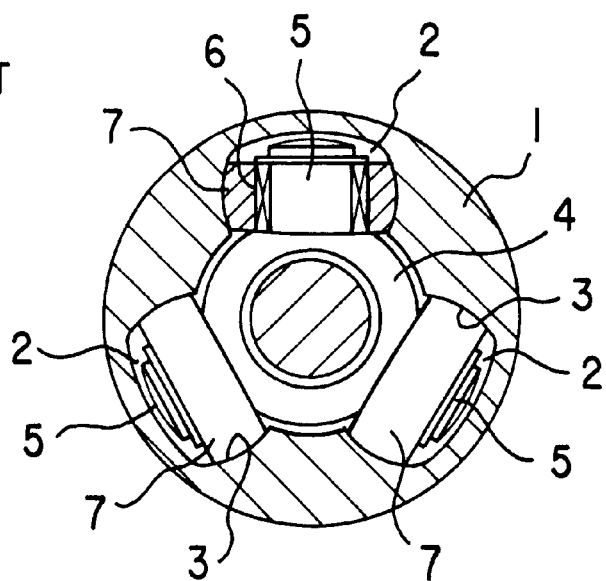
FIG. 10(A) is a cross sectional view of a conventional constant velocity universal joint.
Figure 10B:
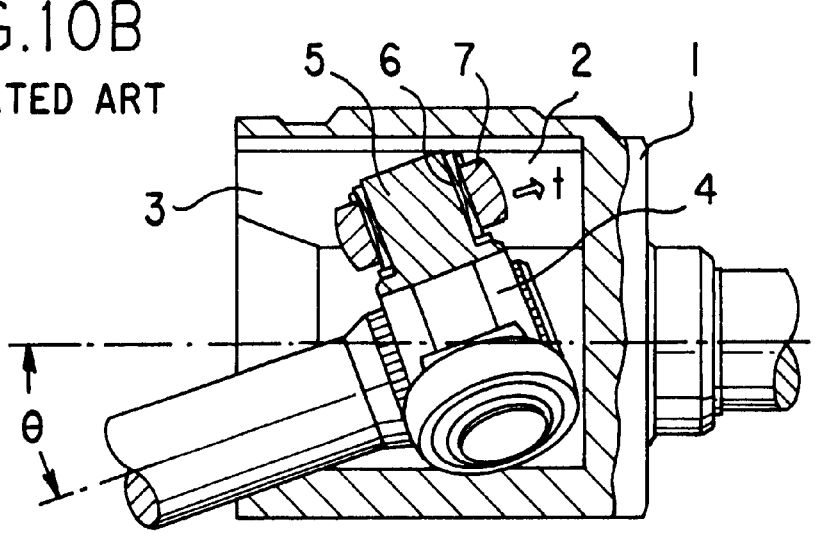
FIG. 10(B) is a longitudinal sectional view of the constant velocity universal joint of FIG. 10(A)
Figure 10C:
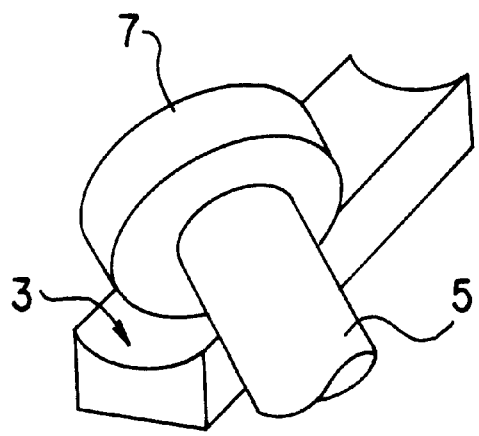
FIG. 10(C) is a schematic perspective view showing the physical relationship between a roller and a roller guideway in FIG. 10(B)

Moreover, FIG. 9 shows an embodiment in which the contact areas β mentioned above are not made of a single ellipse but formed in accordance with a continuously-varying ellipticity (b/a). For example, on the same assumption as employed above that the normal operating angle θ is 15° and the radius of curvature r to the inner periphery of the ring 32 is 2.898a, the ellipticity varies in the following manner. That is, on the contact areas, the ellipticity starts at a value of 1.0 from the intersection with the major axis. It gradually decreases with increasing distance from the intersection. Then, the ellipticity takes a value of 0.635 on the non-contact areas. Alternatively, the ellipticity may decrease gradually from 1.0 to 0.635 as approaching from the major-axis sides to the minor-axis sides, regardless of the contact and non-contact areas. Illustrated in FIG. 9 is the embodiment in which the ellipticity is 1.0 at the intersections of the contact areas with the major axis, and the radius of curvature gradually decreases with increasing distance from the intersections, e.g., at prescribed angles as shown in the figure.

Due to the generally elliptic cross section of the trunnion 22 as described above, grinding just has to be applied exclusively to the load-side, contact areas (β) where a high degree of precision is needed. The remaining non-contact areas may be so worked as to retreat to smaller diameters than the diameters of the original ellipse (shown by the double-dashed-chain line in FIG. 9), for the purpose of grind relief. In this connection, the formation of the grind relief portions does not necessarily require intentional application of cutting or other machining. Those portions may be so shaped upon the forging of the trunnions and then left forge-finished. This cuts the machining time and reduces the cost.

Table 2 shows examples of the value to the clearance C between the major axis 2a of the trunnions 22 and the inner diameter of the rings 32 to absorb the tilts of the trunnions 22 which result from the revolutions of the trunnion center, peculiar to tripod type constant velocity universal joints.

TABLE 2

| Operating angle θ (°) | r: Optimum value (minimum bearing pressure) | Minimum clearance which can absorb revolution |
|---|---|---|
| 25 | 1.369a | $5.207 \times 10^{-3}a$ |
| 20 | 1.994a | $2.725 \times 10^{-3}a$ |
| 15 | 2.898a | $1.131 \times 10^{-3}a$ |
| 10 | 4.731a | $0.330 \times 10^{-3}a$ |

The constant velocity universal joints of the present invention are particularly applicable to a motor vehicle's drive shaft. This application can contribute to improvements in automotive NVH performances associated with slide resistances and inductive thrusts, thereby increasing flexibility in automotive suspension designs.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A constant velocity universal joint comprising:
    an outer joint member having three track grooves each having circumferentially-opposed roller guideways;

a tripod member having three radially-projecting trunnions;

a roller inserted in each of said track grooves; and a ring fitted on each of said trunnions to support said roller rotatably, said roller being movable in axial directions of said outer joint member along said roller guideways, wherein an inner periphery of said ring is shaped arcuate and convex in section, and an outer periphery of each of said trunnions is shaped straight in longitudinal section, as well as formed in cross section so as to make contact with the inner periphery of said ring along a direction perpendicular to an axis of said outer joint member and create a clearance with the inner periphery of said ring in an axial direction of said outer joint member.

2. The constant velocity universal joint according to claim 1, wherein said trunnions are formed to have a cross section of generally elliptic configuration with a major axis perpendicular to the axis of said outer joint member.

3. The constant velocity universal joint according to claim 2, wherein said trunnions are formed to have a cross section of generally elliptic configuration with a major axis perpendicular to the axis of said outer joint member, wherein an ellipticity of said trunnion is represented by a ratio (b/a) that falls within a range of 0.635 and 1.0, where (a) is a semi major axis of said trunnion and (b) is a semi minor axis of said trunnion.

4. The constant velocity universal joint according to claim 3, wherein a generator to the inner periphery of said ring comprises a convex arc at the center, a radius of curvature of the convex arc ranging from 0.6x(a) to 7.0x(a).

5. The constant velocity universal joint according to claim 3, wherein a generator to the inner periphery of said ring comprises a convex arc at the center, a radius of curvature of the convex arc ranging from 0.684x(a) to 4.731x(a).

6. The constant velocity universal joint according to claim 2, wherein said trunnions have a cross section consisting of a contact area and a non-contact area, the contact area being for contacting the inner periphery of said ring, an ellipticity (b/a) on the contact area being greater than an ellipticity (b/a) on the non-contact area, where (a) is a semi major axis of said trunnion and b) is a semi minor axis of said trunnion.

7. The constant velocity universal joint according to claim 6, wherein the ellipticity (b/a) on the contact area ranges from 0.8 to 0.9, and the ellipticity (b/a) on the non-contact area ranges from 0.6 to 0.7.

8. The constant velocity universal joint according to claim 7, wherein a radius of curvature to a convex arc of the inner periphery of said ring ranges from 2.8x(a) to 2.9x(a).

9. The constant velocity universal joint according to claim 2, wherein, in a general elliptic cross section of said trunnions:

an ellipticity (b/a) is 1.0 at an intersection with the major axis;

the ellipticity (b/a) gradually decreases with increasing distance from the intersection, so as to range from 0.6 to 0.7 at an outermost position of a contact area with the inner periphery of said ring; and the ellipticity (b/a) ranges from 0.6 to 0.7 on a non-contact area, where (a) is a semi major axis of said trunnion and (b) is a semi minor axis of said trunnion.

10. The constant velocity universal joint according to claim 2, wherein, in a general elliptic cross section of said trunnions:

an ellipticity (b/a) is 1.0 at an intersection with the major axis;

the ellipticity (b/a) gradually decreases with increasing distance from said intersection; and the ellipticity (b/a) ranges from 0.6 to 0.7 at an intersection with a minor axis of said trunnion, where (a) is a semimajor axis of said trunnion and (b) is a semiminor axis of said trunnion.

11. The constant velocity universal joint according to claim 2, wherein said trunnions are formed to have a cross section of generally elliptic configuration with a major axis perpendicular to the axis of said outer joint member, wherein an ellipticity of said trunnion is represented by a ratio (b/a) that falls within a range of 0.6 35 and 1.0, where (a) is a semimajor axis of said trunnion and (b) is a semiminor axis of said trunnion.

12. The constant velocity universal joint according to claim 1, wherein the outer periphery of each trunnion and the inner periphery of said ring create a clearance of 0.001x (a) or more therebetween in a circumferential direction of said outer joint member, where (a) is a semimajor axis of a generally elliptic cross section of said trunnion.

13. The constant velocity universal joint according to claim 1, wherein a generator to the inner periphery of said ring is composed of an arc portion at a center of said ring and relief portions on both sides of said center.

14. The constant velocity universal joint according to claim 1, wherein a plurality of rolling elements are arranged between said ring and said roller to allow relative rotations between said ring and said roller.

15. The constant velocity universal joint according to claim 14, wherein said rolling elements are needle rollers.

16. The constant velocity universal joint according to claim 1, wherein the outer periphery of said roller is formed in a spherical form to make an angular contact with said roller guideways in said outer joint member.

17. The constant velocity universal joint according to claim 1, wherein the outer periphery of each of said trunnions that contacts the inner periphery of said ring is ground to provide a high degree of precision to machining of said trunnion.

* * * * *